United States Patent [19]
Yang

[11] Patent Number: 5,040,809
[45] Date of Patent: Aug. 20, 1991

[54] PORTABLE FOLDING CART

[76] Inventor: Anthony Yang, 1639 E. Harmon, #3, Las Vegas, Nev. 89119

[21] Appl. No.: 566,047

[22] Filed: Aug. 10, 1990

[51] Int. Cl.⁵ .............................................. B62B 3/02
[52] U.S. Cl. ...................................... 280/42; 280/651
[58] Field of Search ................. 280/42, 641, 651, 659, 280/655

[56] References Cited

U.S. PATENT DOCUMENTS

| | | | |
|---|---|---|---|
| 2,639,162 | 5/1953 | Schon | 280/42 |
| 3,861,695 | 1/1975 | Shourek et al. | 280/659 X |
| 4,505,495 | 3/1985 | Foss et al. | 280/651 |
| 4,619,464 | 10/1986 | Hwang | 280/659 X |

FOREIGN PATENT DOCUMENTS

494730  5/1952  Italy ...................... 280/42

Primary Examiner—Andres Kashnikow
Assistant Examiner—Martin Gerich
Attorney, Agent, or Firm—Quirk, Tratos & Roethel

[57] ABSTRACT

A portable folding cart can be collapsed into a compact storage assembly. The base of the cart is a generally rectangular platform for supporting items to be transported. A plurality of wheels are mounted to the underside of the platform. The platform has a right side member and left side member, each of the side members being pivotally foldable at a joint along the length of the side member. A plurality of cross braces join the side members to each other, each cross brace also being pivotally foldable at a joint along the length of the cross brace. At the pivot hinge of each cross member, a spring is provided to bias the cross brace into its open position. A handle is attached to the platform and the handle has a pair of upright members, each having a plurality of telescoping segments. The right side upright member is pivotally attached to the right side member of the platform and the left side upright member is pivotally attached to the left side member of the platform. Upper and lower cross members complete the handle and are pivotally attached to the upright members.

24 Claims, 6 Drawing Sheets

PORTABLE FOLDING CART

This invention relates to a portable folding cart, and more particularly to portable folding cart having a collapsible telescoping handle which pivots into a folding relationship with a platform which is also pivotally foldable into a compact assembly capable of being stored and transported in a carrying bag that can be carried by a single person.

BACKGROUND OF THE INVENTION

There have been many devices and contrivances that have been created to assist in the moving and transporting of items from place to place. Ever since the invention of the wheel, man has realized that it is easier to push and pull items that need to be moved than it is to pick the items up and carry them.

In modern life, there remains a need for a small, portable and compact cart that can be used on an "as-needed" basis to move items around the home or workplace. Presently, the typical full size shopping cart found in a grocery store is often used for that task but it has the drawback of being large and bulky making it difficult to find a storage space for the shopping cart in an average home or office. It is also inconvenient to store items for transport in a shopping cart since the item must be small and light enough to be lifted over the sides of the basket of the cart.

Smaller personal sized shopping carts may also be used. These carts have the advantage of being foldable so that storage is convenient but these carts have limited carrying space and the items to be transported need to lifted into the basket. The weight capacity of these shopping carts is also quite limited.

Many offices utilize a flat bed type cart which can carry heavy items. The overall size of these carts (typically five to six feet in length with a handle up to three to four feet off the floor) make them particularly inconvenient for use in an office or home. These flat bed carts do not fold for storage and there is no reasonable way to transport these flat bed carts from location to location since they are much too heavy and bulky to be transported by a single person.

There is also a need for a small, portable cart that can be used when a person is traveling. It is often necessary to transport a number of luggage bags and other accessories that the traveller needs on his journey. The typical fold up luggage rack is quite small and can barely accommodate two pieces of luggage let alone the other items that a person normally takes on a trip, especially an overseas journey. There is a need for a portable folding cart that can carry up to 300 pounds or more of luggage and accessories, yet will still be foldable into a compact size small enough to be transported in a carrying bag by a single person. The portable folding cart also needs to be small enough to fit into the overhead compartment or under the seat on an airplane.

It is an object of the present invention to provide a cart for transporting items that itself can be easily folded into a compact storage assembly that can be stored in a carrying bag and can be transported by a single person.

It is a feature of the present invention to provide a portable folding cart that has a generally rectangular platform with foldable side members and foldable cross braces, a handle comprising a pair of upright members having telescoping segments and a cross member joining the upright members and a plurality of wheels mounted to the platform. The handle folds into a collapsed position adjacent the platform and the platform further folds up so that the resulting assembly is quite compact.

It is an advantage of the present invention that a cart suitable for transporting items can be completely collapsed into a small compact assembly that can be stored in a carrying bag and easily transported by a single person.

SUMMARY OF THE INVENTION

The present invention comprises a portable folding cart capable of being collapsed into a compact storage assembly. The base of the cart is a generally rectangular platform for supporting items to be transported. A plurality of wheels are mounted to the platform to provide for ease in movement of the platform when it is being used to transport items. The platform has a right side member and left side member, each of the side members being pivotally foldable at a joint along the length of the side member. A plurality of cross braces join the right side member to the left side member, each cross brace also being pivotally foldable at a joint along the length of the cross brace. At the pivot point of each cross member, a spring is provided to bias the cross brace into its open position. A handle is attached to the platform and the handle comprises a pair of upright members, each member having a plurality of telescoping segments so that the handle will be situated at a height so that the cart can easily be rolled. The right side upright member is pivotally attached to the right side member and the left side upright member is pivotally attached to the left side member. An upper cross member and a lower cross member are each pivotally attached to one of the upright members and each has a connection element for engaging the cross member to the other upright member. These cross members add stability and support to the folding cart when it is in use. When the cart is collapsed into its compact storage assembly the cross members are first disengaged from one of the upright members and pivotally folded against the other upright member, each of the upright members are then folded against its respective side member, each of the cross braces is then folded along its length and each side member is then folded along its length. The resulting collapsed assembly is quite compact and easily fits into a storage bag which can then be transported by a single person to any location at which it is desired to use the cart.

DETAILED DESCRIPTION OF THE PREFERRED EMBODIMENTS

Figure 1:
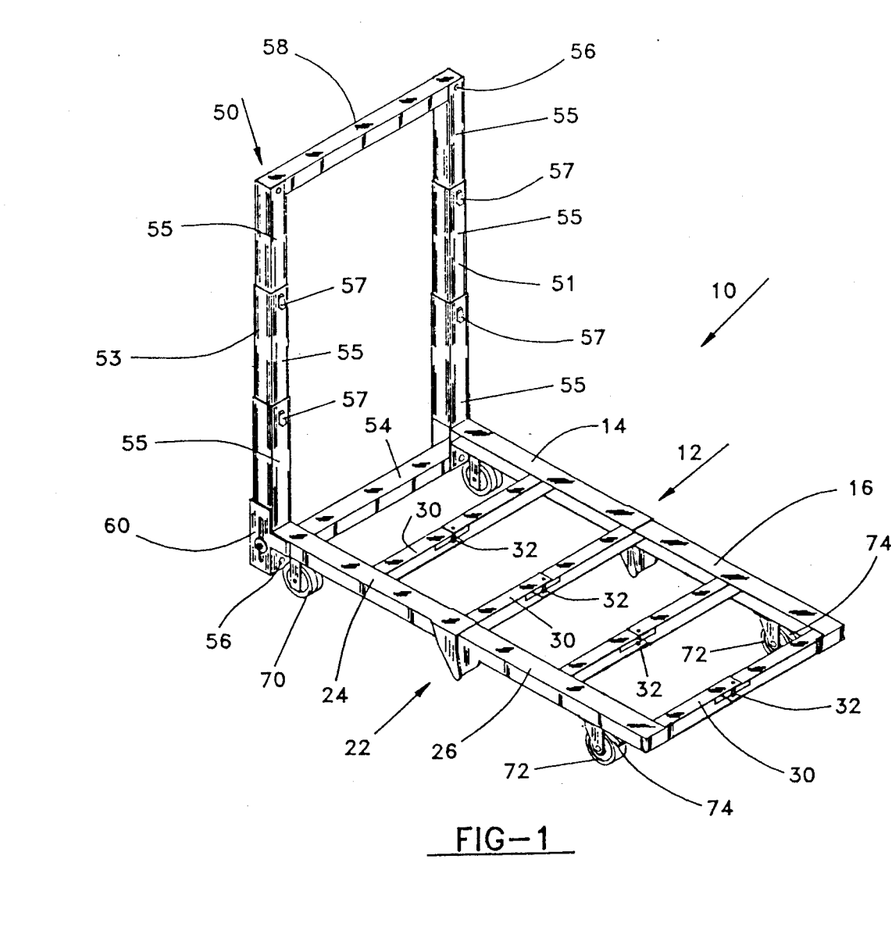
FIG. 1 shows a perspective view of the portable folding cart of the present invention in its fully extended position.

The portable folding cart of the present invention is shown in its unfolded position generally at 10 in FIG. 1. The portable folding cart 10 is arranged in a generally rectangular configuration and has a right side member 12 and a left side member 22. The right side member 12 has a forward leg 14 and a rearward leg 16 joined together at a hinge point generally at the midpoint of the right side member 12. Similarly, the left side member 22 has a forward leg 24 and a rearward leg 26 joined together at a hinge point generally at the midpoint of the left side member 22.

At the rearward end of each of the forward leg 14 and the forward leg 24 there is provided a first hinge extension 80 and on the forward end of each of the rearward leg 16 and rearward leg 26 there is provided a second hinge extension 82. A pivot pin 84 joins each first hinge extension 80 with its respective adjoining second hinge extension 82 to hold them together in a pivoting relationship.

Connecting the right side member 12 and the left side member 22 are a plurality of cross braces 30 with the resulting configuration forming the base of the portable folding cart 10 upon which items can be placed or stacked for transport to any desired location. Each cross brace 30 is formed of two sections joined at the approximate center of the cross brace 30 by a pivot pin 32. As shown more clearly in FIG. 6, each pivot pin 32 has a spring 34 mounted thereon to effect a spring hinge arrangement and the spring 34 is biased to hold the cross brace 30 in its unfolded or straight position shown in FIG. 1.

Figure 6:
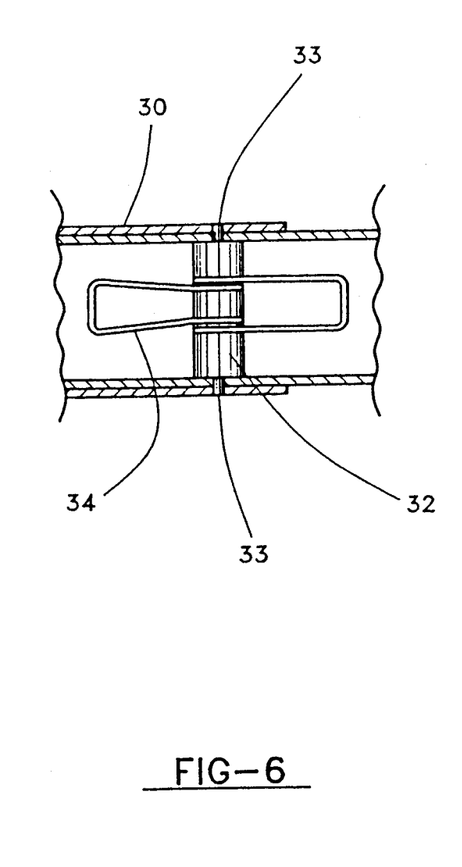
FIG. 6 shows a partial end view of the portable folding cart of the present invention illustrating the manner in which the joint on the cross brace is configured.

Also in the preferred embodiment of the present invention shown in FIG. 6, the pivot pin 32 has a body portion which is large enough to provide structural support to the cross brace 30, which is in the shape of a U-shaped member as will be more fully described herein. Each end 33 of the pivot pin 32 are mounted in apertures in the body of the cross brace 30 to secure the pivot pin 32 to the cross brace 30. In the preferred embodiment of this invention, all of the hinges shown and described herein will be constructed in this manner to provide structural support to the interior channels of the U-shaped members comprising the various parts of this apparatus.

In the preferred embodiment, each cross brace 30 is permanently connected to the right side member 12 and left side member 22 by welding, which is also the preferred manner of joining the other non-folding parts of the portable folding cart 10 together. Alternatively, non-permanent connection means such as screws or bolts could be used to fasten the nonfolding parts of the portable folding cart 10 together.

At the forward end of the right side member 12 and left side member 22, a handle 50 is connected. The handle 50 comprises a right upright member 51 and a left upright member 53. Each upright member is attached to the forward end of its respective side member and each upright member comprises a plurality of telescoping segments 55 so that the height of the handle may be extended to a height suitable to the user. Each telescoping segment 55 is provided with a conventional clamp 57 allowing the lengths of the telescoping segments 55 to be adjusted to whatever length the user desires. Instead of clamps 55, other adjusting devices, such as set screws or pins could be used.

The forward ends of the right side member 12 and the left side member 22 are each provided with a bracket 60 which receives the lower end of the right upright member 51 and the lower end of the left upright member 53 in a manner to be explained herein. A lower cross piece 54 is provided between each of the brackets 60 and the lower cross piece 54 is 12 provided with a internal hinge 56 at one end to connect the lower cross piece 54 in a pivoting relationship to one of the brackets 60, such as the bracket 60 at the forward end of the left side member 22.

Between the upper ends of the right upright member 51 and the left upright member 53, there is provided a upper cross piece 58 which is similarly internally hinged at one end to the top of one of the upright members to connect the upper cross piece 58 in a pivoting relationship to the upright members. In the preferred embodiment of the present invention, the upper cross piece 58 is connected to the top of the upright member opposite from the upright member to which the lower cross piece 54 is connected, for example to the right upright member 51 as shown in the drawings. This arrangement allows sufficient space for the folding of both the lower cross piece 54 and the upper cross piece 58 when the cart is folded up as will be explained herein.

Figure 2:
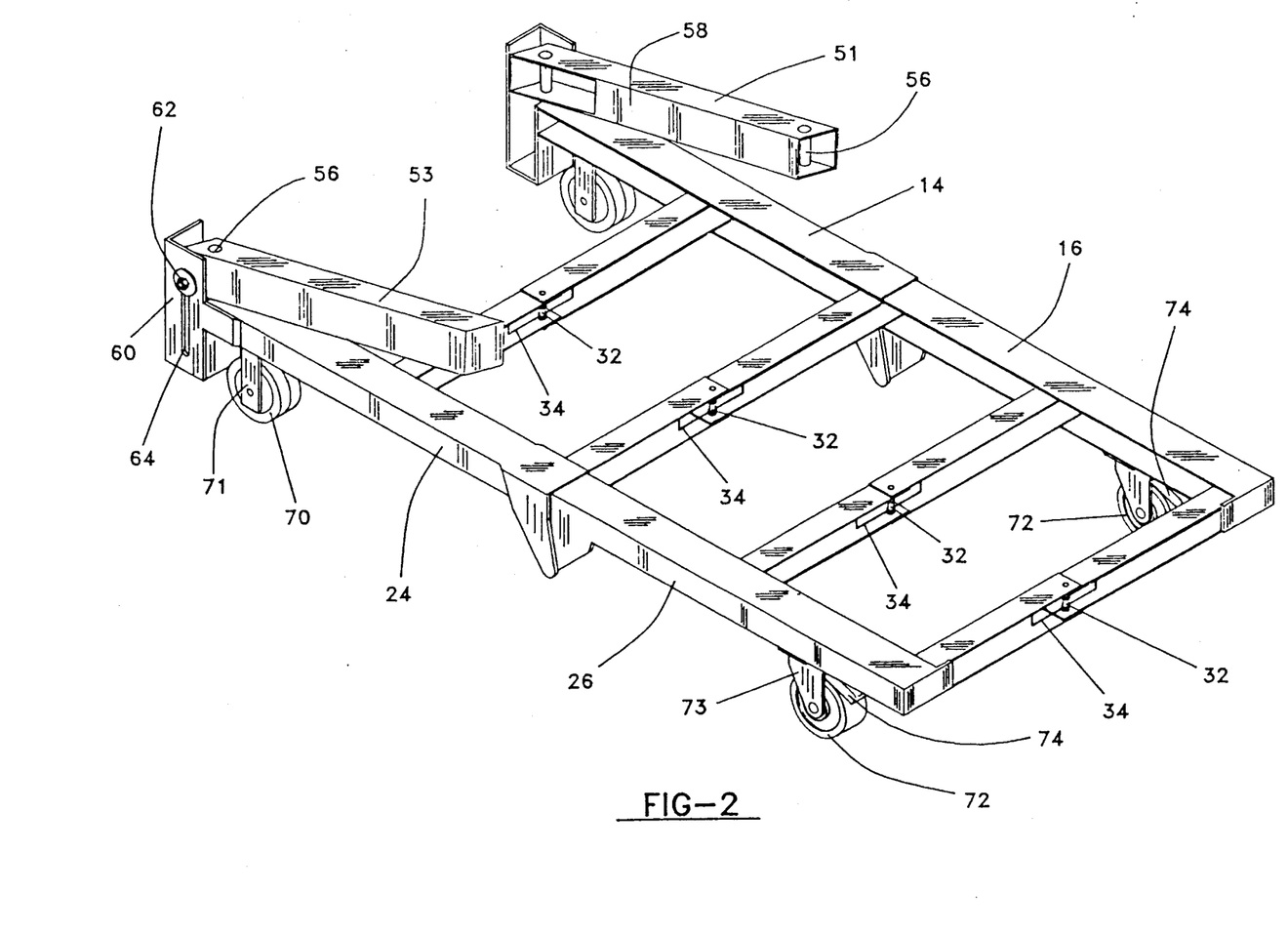
FIG. 2 shows a perspective view of the portable folding cart of the present invention in a partially folded position with the handle folded down.

As shown in FIG. 2, each bracket 60 has a guide slot 64 that receives a guide pin 62 which is mounted to the lower end of each of the right upright member 51 and left upright member 53. A pair of fixed wheels 70 are mounted by means of fixed wheel mounts 71 to the underside of the forward leg 14 and the forward leg 24 and a pair of caster wheels 72 are mounted by means of caster wheel mounts 73 to the under side of the rearward leg 16 and rearward leg 26 to permit the portable folding cart 10 to be rolled about the workplace. A conventional wheel brake 74 is provided on one or more of the wheels to prevent the portable folding cart 10 from rolling, if locking of the wheels is desired.

In the preferred embodiment of the present invention, each of the frame members of the portable folding cart 10 are fabricated from U-shaped metal stock. The interior space of the U provides the necessary interior channels so that the parts can be folded together when it is desired to provide for storage of the portable folding cart 10. It is this interior channel space that receives reinforcing support from the body of the pivot pins, such as pivot pin 34, as discussed above.

FIG. 1 shows the portable folding cart 10 in its fully open position with the telescoping segments 55 of the right upright member 51 and left upright member 53 each fully extended, the upper cross piece 58 extended between the top of the right upright member 51 and the top of the left upright member 53 with one end of the upper cross piece 58 internally hinged to the top of the right upright member 51 and the other end of the upper cross piece 58 fitted into the channel of the left upright member 53 and thus closing off the top of the left upright member 53.

The lower cross piece 54 is also extended between the bottom of the right upright member 51 and left upright member 53 with one end of the lower cross piece 54 internally hinged to the bottom of the left upright member 53 and the other end of the lower cross piece 54 fitted into the channel of the right upright member 51. In this fully extended position, the portable folding cart 10 can be utilized to transport items about the home, office or any travel location such as an airport. The telescoping segments 55 raise the height of the upper cross piece 58 of the handle 50 to an appropriate height so that the user can easily grasp the upper cross piece 58 to push or pull the portable folding cart 10 as needed to transport items.

FIG. 2 shows the portable folding cart 10 in its first stage of being folded up. The upper cross piece 58 is disconnected from the top of the left upright member 53, is pivoted about its internal hinge 56 and folds into the interior channel of the right upright member 51. Similarly, the lower cross piece 54 is disconnected from the inside of the channel of the right upright member 51, is pivoted about its internal hinge 56 and folds into the interior channel of the left upright member 53. Each of the telescoping segments 55 are collapsed so that the right upright member 51 and left upright member 53 are only one telescoping segment in length.

Next, the guide pin 62 is loosened on each bracket 60 so that the right upright member 51 and left upright member 53 can be slid slightly upwardly in the guide slot 64 of the bracket 60. This allows each upright member to pivot about the guide pin 62 and fold down into abutting relation with the forward leg 14 and the forward leg 24, respectively. In the fully extended position shown in FIG. 1, the lower end of the right upright member 51 and of the left upright member 53 each sets securely in the channel of the bracket 60 to prevent the handle 50 from folding when the portable folding cart 10 is used to transport items.

Figure 3:
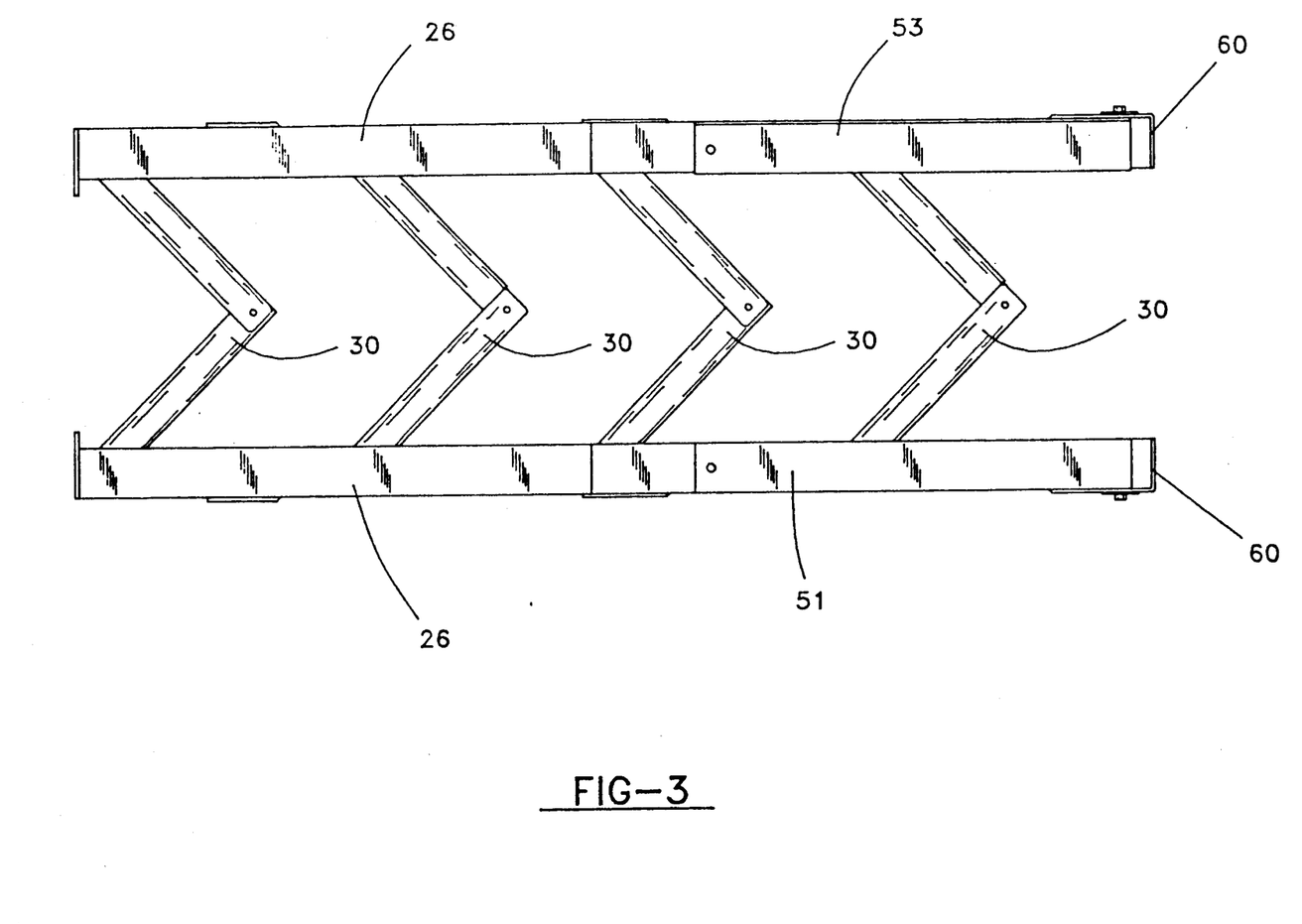
FIG. 3 shows a top view of the portable folding cart of the present invention in a partially folded position with the handle fully folded and the cross braces partially folded.

FIG. 3 shows the next stage of the folding of the portable folding cart 10. The upright members have been folded down so that each is in abutment with the forward leg 14 and forward leg 24, respectively. Each cross brace 30 is now grasped by the user and given a slight push on its center so that each cross brace 30 pivots about pivot pin 32. The force of the spring 34 used to bias each cross brace 30 into its straight position shown in FIG. 1 is easily overcome by the push by the user and each right side member 12 and left side member 22 are simply pushed together. The interior channels of the right side member 12 and left side member 22 accommodate the cross braces 30 until the right side member 12 and left side member 22 are in abutting relationship.

Figure 4:
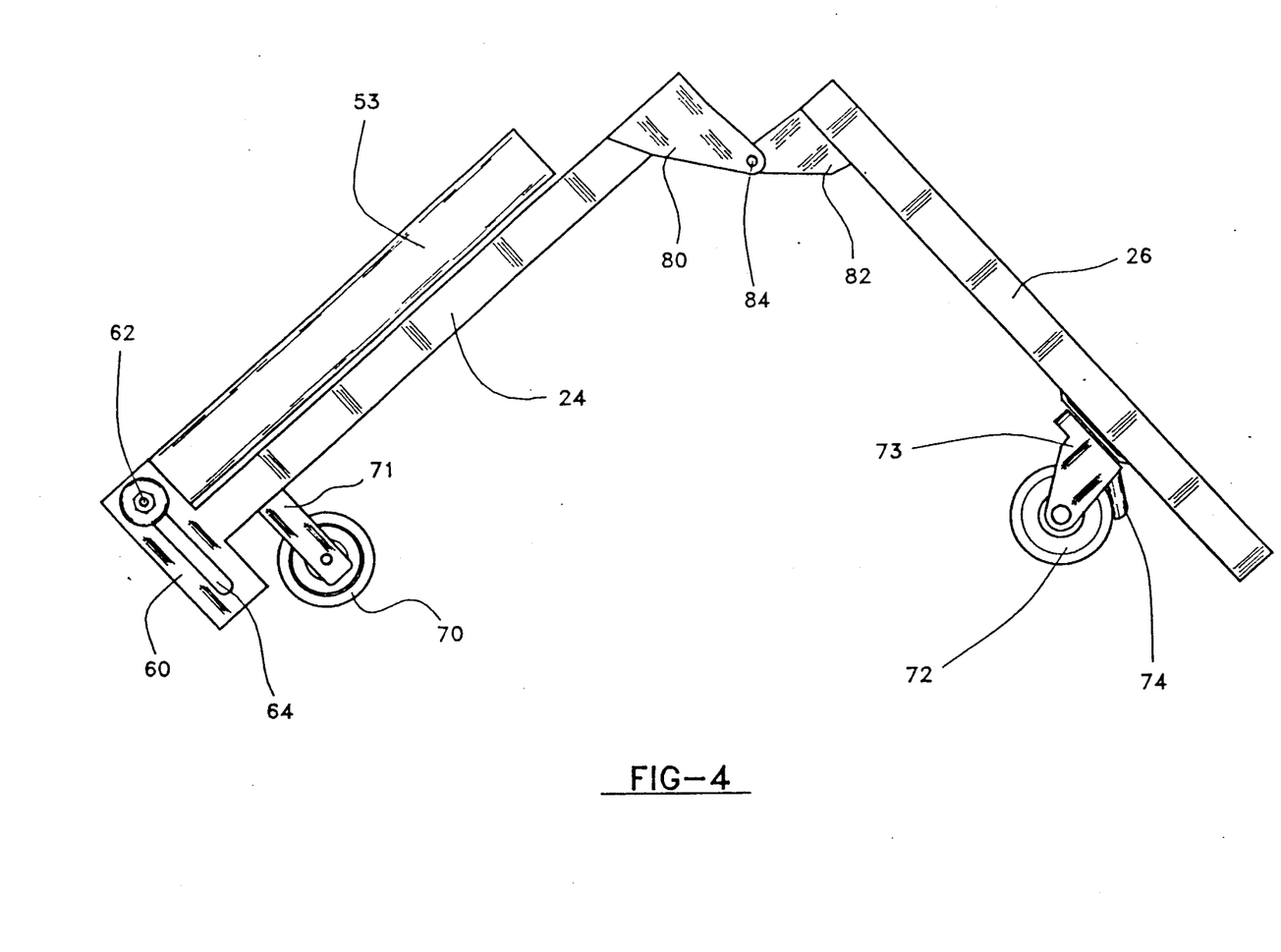
FIG. 4 shows a side view of the portable folding cart of the present invention in a partially folded position with the handle and cross braces fully folded and the side members partially folded.

FIG. 4 shows the next stage of the folding of the portable folding cart 10. Each upright member remains folded down into abutting relationship with the forward leg 14 and the forward leg 24. Each cross brace 30 has been folded about its pivot pin 32 and stored in the interior channels of the right side member 12 and left side member 22, which are now abutting one another. Each right side member 12 and left side member 22 can then be folded about their respective pivot pins 84 to further collapse the portable folding cart 10.

Figure 5:
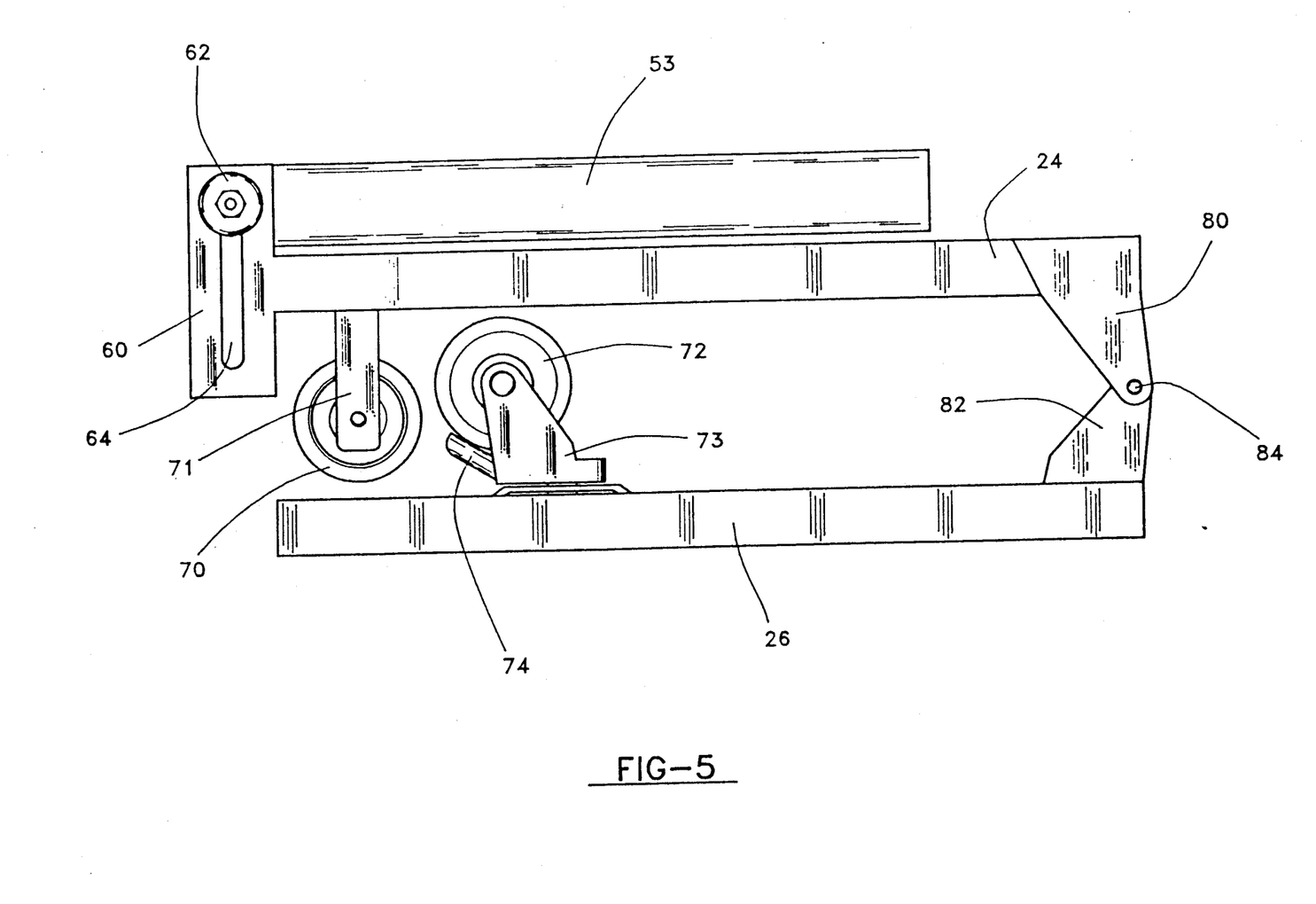
FIG. 5 shows a side view of the portable folding cart of the present invention in a fully folded position.

Finally, FIG. 5 shows the portable folding cart 10 in its fully folded configuration. The respective locations of the attachment of the fixed wheels 70 and the caster wheels 72 to the underside of right side member 12 and the left side member 22 allows the fixed wheels 70 and the caster wheels 72 to overlie each other to permit the portable folding cart 10 to be folded into a quite compact arrangement. By providing the fixed wheels 70 close to the forward end of the portable folding cart 10, the fixed wheels 70 provide additional support for the extra weight of the cart due to the positioning of the handle 50 at one end.

In the preferred embodiment, the resulting portable folding cart 10 will have a length of approximately 31", a width of approximately 15" and a height of approximately 36", when the cart is fully opened and operational. However, upon full collapsing of the cart, the cart 10 will have a length of approximately 16", a width of approximately 6" and a height of approximately 3". This compact configuration will easily fit into a carrying bag.

In the preferred embodiment, the portable folding cart 10 is made from lightweight steel or aluminum and it is anticipated that the resulting weight of the portable folding cart 10 will be on the order of 7 or 8 pounds. This light weight makes the portable folding cart 10 transportable by a single person. The rigid construction of the cart will nevertheless permit weight on the order of 300 pounds to be easily transported by a single person.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A portable folding cart capable of being collapsed into a compact storage assembly comprising:
    a) a platform for supporting items to be transported, the platform having a right side member and a left side member, each of the side members being pivotally foldable at a joint along the length of the side chamber,
    b) a plurality of U-shaped cross braces joining the right side member to the left side member, each cross brace being pivotally foldable at a joint along the length of the cross brace, each cross brace including a pivot pin positioned on the interior of the U-shaped cross brace at the joint where the cross brace folds and a bias spring mounted abutting the pivot pin to bias the cross brace into a straight position, each pivot pin including an enlarged body portion having end portions that engage the U-shaped cross brace to provide structural support to the cross brace,
    c) a plurality of wheels mounted to the platform, and
    d) a handle attached to the platform, the handle comprising:
        1) a right side upright member pivotally attached to the right side member,
        2) a left side upright member pivotally attached to the left side member,
        3) an upper cross member pivotally attached at one end thereof to the right side upright member, and removable connected to the left side upright member, and
        4) a lower cross member pivotally attached at one end thereof to the left side upright member, and removably connected to the right side upright member
    whereby when the cart is collapsed into its compact storage assembly, each cross member is removably disengaged from the upright member, pivotally folded against the other upright member, each of the upright members is folded against its respective side member, each side member is folded along its length and each of the cross braces is folded along its length.

2. The portable folding cart of claim 1 wherein each side member comprises a forward leg having a first hinge extension and a rearward leg having a second hinge extension and a pivot pin joining the first hinge extension and the second hinge extension.

3. The portable folding cart of claim 1 wherein the wheels comprise a plurality of fixed wheels and a plurality of caster wheels mounted to the platform.

4. The portable folding cart of claim 1 wherein at least one wheel brake is mounted adjacent a wheel for preventing movement of the cart.

5. The portable folding cart of claim 1 wherein each of the upright members comprises a plurality of telescoping segments.

6. The portable folding cart of claim 1 wherein the right side upright member includes an internal hinge for pivotally attaching the upper cross member thereto and the left side upright member includes an internal hinge for pivotally attaching the lower cross member thereto.

7. The portable folding cart of claim 1 wherein each side member has a bracket attached thereto, each bracket having a guide slot and each upright member having a guide pin attached thereto for slidably positioning each upright member into its respective bracket.

8. A portable folding cart capable of being collapsed into a compact storage assembly comprising:
   a) a platform for supporting items to be transported, the platform having a right side member and a left side member, each of the side members being pivotally foldable at a joint along the length of the side member,
   b) a plurality of U-shaped cross braces joining the right side member to the left side member, each cross brace being pivotally foldable at a joint along the length of the cross brace, each cross brace including a pivot pin positioned on the interior of the U-shaped cross brace at the joint where the cross brace folds and a bias spring mounted abutting the pivot pin to bias the cross brace into a straight position, each pivot pin including an enlarged body portion having end portions that engage the U-shaped cross brace to provide structural support to the cross brace, and
   c) a handle attached to the platform, the handle comprising:
      1) a right side upright member pivotally attached to the right side member,
      2) a left side upright member pivotally attached to the left side member,
      3) an upper cross member pivotally attached at one end thereof to the right side upright member, and removable connected to the left side upright member, and
      4) a lower cross member pivotally attached at one end thereof to the left side upright member, and removably connected to the right side upright member
   whereby when the cart is collapsed into its compact storage assembly, each cross member is removably disengaged from the upright member, pivotally folded against the other upright member, each of the upright members is folded against its respective side member, each side member is folded along its length and each of the cross braces is folded along its length.

9. The portable folding cart of claim 8 wherein each side member comprises a forward leg having a first hinge extension and a rearward leg having a second hinge extension and pivot pin joining the first hinge extension and the second hinge extension.

10. The portable folding cart of claim 8 wherein each of the upright members comprises a plurality of telescoping segments.

11. The portable folding cart of claim 8 wherein the right side upright member includes an internal hinge for pivotally attaching the upper cross member thereto and the left side upright member includes an internal hinge for pivotally attaching the lower cross member thereto.

12. The portable folding cart of claim 8 wherein each side member has a bracket attached thereto, each bracket having a guide slot and each upright member having a guide pin attached thereto for slidably positioning each upright member into its respective bracket.

13. A portable folding cart capable of being collapsed into a compact storage assembly comprising:
   a) a platform for supporting items to be transported, the supporting means including a right side member and a left side member, each of the side members having means for folding the side member at a joint along the length of the side member,
   b) at least one brace means for joining the right side member to the left side member, the means for bracing including means for folding the brace means at a joint along the length of the brace means, the means for folding the brace means including means for structurally supporting the interior of the brace,
   c) means for moving the platform means, and
   d) a handle means for grasping the platform, the handle means being attached to the platform and comprising:
      1) a right side upright member pivotally attached to the right side member,
      2) a left side upright member pivotally attached to the left side member,
      3) an upper cross member, means for pivotally attaching the upper cross member at one end thereof to the right side upright member and means for removably connecting the upper cross member to the left side upright member, and
      4) a lower cross member, means for pivotally attaching the lower cross member at one end thereof to the left side upright member and means for removably connecting the lower cross member to the right side upright member
   whereby when the cart is collapsed into its compact storage assembly, each cross member is removably disengaged from the upright member, pivotally folded against the other upright member, each of the upright members is folded against its respective side member, each side member is folded along its length and each of the cross braces is folded along its length.

14. The portable folding cart of claim 13 wherein each side member comprises a forward leg, a rearward leg and pivot means for joining the forward leg to the rearward leg.

15. The portable folding cart of claim 13 wherein the means for folding the brace means further including spring means for biasing the cross brace into a straight position.

16. The portable folding cart of claim 13 wherein the means for moving the platform means comprises a plurality of fixed wheels and a plurality of caster wheels mounted to the platform.

17. The portable folding cart of claim 16 wherein at least one means for braking the cart is mounted adjacent a wheel for preventing movement of the cart.

18. The portable folding cart of claim 13 wherein each of the upright members comprises a plurality of telescoping segments.

19. A portable folding cart capable of being collapsed into a compact storage assembly comprising:
   a) a platform for supporting items to be transported, the supporting means including a right side member and a left side member, each of the side members having means for folding the side member at a joint along the length of the side member,
   b) at least one brace means for joining the right side member to the left side member, the means for bracing including means for folding the brace means at a joint along the length of the brace means, the means for folding the brace means including means for structurally supporting the interior of the brace,
   c) a handle means for grasping the platform, the handle means being attached to the platform and comprising:
      1) a right side upright member pivotally attached to the right side member,
      2) a left side upright member pivotally attached to the left side member,
      3) an upper cross member, means for pivotally attaching the upper cross member at one end thereof to the right side upright member and means for removably connecting the upper cross member to the left side upright member, and
      4) a lower cross member, means for pivotally attaching the lower cross member at one end thereof to the left side upright member and means for removably connecting the lower cross member to the right side upright member
   whereby when the cart is collapsed into its compact storage assembly, each cross member is removably disengaged from the upright member, pivotally folded against the other upright member, each of the upright members is folded against its respective side member, each side member is folded along its length and each of the cross braces is folded along its length.

20. The portable folding cart of claim 19 wherein each side member comprises a forward leg, a rearward leg and pivot means for joining the forward leg to the rearward leg.

21. The portable folding cart of claim 19 wherein the means for folding the brace means further includes spring means for biasing the cross brace into a straight position.

22. The portable folding cart of claim 19 wherein each of the upright members comprises a plurality of telescoping segments.

23. A portable folding cart capable of being collapsed into a compact storage assembly comprising:
   a) a platform for supporting items to be transported, the platform having a right side member and a left side member, each of the side members being pivotally foldable at a joint along the length of the side member,
   b) a plurality of cross braces joining the right side member to the left side member, each cross brace being pivotally foldable at a joint along the length of the cross brace,
   c) a plurality of wheels mounted to the platform,
   d) a handle attached to the platform, the handle comprising:
      1) a right side upright member pivotally attached to the right side member,
      2) a left side upright member pivotally attached to the left side member,
      3) an upper cross member pivotally attached at one end thereof to the right side upright member, and removably connected to the left side upright member, and
      4) a lower cross member pivotally attached at one end thereof to the left side upright member, removably connected to the right side upright member, and
   e) each side member having a bracket attached to an end thereof, each bracket defining a socket extending below the side member for confining and receiving a lower end of a corresponding upright member at a position below the side member therein when the upright member is in its unfolded position so that the upright member is securely held in the bracket, and each bracket further including a guide slot that extends along the bracket and each upright member having a guide pin attached thereto and mounted in the guide slot on the upright member for slidably positioning each upright member into its corresponding bracket to allow positioning of the upright member either in its folded or unfolded position
   whereby when the cart is collapsed into its compact storage assembly, each cross member is removably disengaged from the upright member, pivotally folded against the other upright member, each of the upright members is folded against its respective side member, each side member is folded along its length and each of the cross braces is folded along its length.

24. A portable folding cart capable of being collapsed into a compact storage assembly comprising:
   a) a platform for supporting items to be transported, the supporting means including a right side member and a left side member, each of the side members being pivotally foldable at a joint along the length of the side member,
   b) a plurality of cross braces joining the right side member to the left side member, each cross brace being pivotally foldable at a joint along the length of the cross brace,
   d) a handle attached to the platform, the handle comprising:
      1) a right side upright member pivotally attached to the right side member,
      2) a left side upright member pivotally attached to the left side member,
      3) an upper cross member pivotally attached at one end thereof to the right side upright member, and removably connected to the left side upright member, and
      4) a lower cross member pivotally attached at one end thereof to the left side upright member, removably connected to the right side upright member, and
   d) each side member having a bracket attached to an end thereof, each bracket defining a socket extending below the side member for confining and receiving a lower end of a corresponding upright member at a position below the side member therein when the upright member is in its unfolded position so that the upright member is securely held in the bracket, and each bracket further including a guide slot that extends along the bracket and each upright member having a guide pin attached thereto and mounted in the guide slot on the upright member for slidably positioning each upright member into its corresponding bracket to allow positioning of the upright member either in its folded or unfolded position whereby when the cart is collapsed into its compact storage assembly, each cross member is removably disengaged from the upright member, pivotally folded against the other upright member, each of the upright members is folded against its respective side member, each side member is folded along its length and each of the cross braces is folded along its length.

* * * * *